United States Patent
Mozipo et al.

(10) Patent No.: US 7,652,899 B2
(45) Date of Patent: Jan. 26, 2010

(54) SWITCHING SEQUENCE CONTROL METHOD FOR A PS-ZVT BRIDGE CONVERTER

(75) Inventors: Aurelien T. Mozipo, Kokomo, IN (US); Robert D. Maple, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 411 days.

(21) Appl. No.: 11/807,718

(22) Filed: May 30, 2007

(65) Prior Publication Data

US 2008/0298087 A1      Dec. 4, 2008

(51) Int. Cl.
*H02M 7/5387*   (2007.01)
(52) U.S. Cl. .......................................... 363/98
(58) Field of Classification Search ............. 363/17, 363/56.02, 98, 132
See application file for complete search history.

(56) References Cited

U.S. PATENT DOCUMENTS

| 4,201,957 | A | * | 5/1980 | Cathell | 331/110 |
|---|---|---|---|---|---|
| 4,864,479 | A | | 9/1989 | Steigerwald et al. | |
| 6,069,808 | A | * | 5/2000 | Panahi et al. | 363/98 |
| 6,469,491 | B1 | * | 10/2002 | Schultz | 324/120 |
| 2008/0298087 | A1 | * | 12/2008 | Mozipo et al. | 363/17 |

OTHER PUBLICATIONS

Andreycak, Bill; Phase Shifted, Zero Voltage Transition Design Considerations and the UC 3875 PWM Controller; Unitrode Application Note U-136A; May 1997.

* cited by examiner

*Primary Examiner*—Jeffrey L Sterrett
(74) *Attorney, Agent, or Firm*—Jimmy L. Funke

(57) ABSTRACT

The switching sequence of a phase-shifted zero-voltage-transition (PS-ZVT) full bridge converter circuit is alternated between two modes by periodically reversing the switching sequence for diagonally opposed switching devices of the bridge. Over a period of operation, each of the switching devices periodically conduct the entire free-wheeling current that occurs during load current reversal transitions so as to balance their average power dissipation and reduce the overall power dissipation of the converter circuit.

5 Claims, 3 Drawing Sheets

SWITCHING SEQUENCE CONTROL METHOD FOR A PS-ZVT BRIDGE CONVERTER

TECHNICAL FIELD

The present invention relates to phase-shifted zero-voltage-transition converter circuits, and more particularly to a switching sequence control method that balances power dissipation in the switching devices of the converter circuit.

BACKGROUND OF THE INVENTION

Phase-shifted zero-voltage-transition (PS-ZVT) full bridge converter circuits eliminate switching losses and substantially decrease electromagnetic interference (EMI) by utilizing the effects of parasitic capacitance in switching devices such as MOSFETs and IGBTs in conjunction with parasitic and/or additional inductance to ensure that the switching devices each transition to a conductive state when the switched voltage is essentially zero. See, for example, the U.S. Pat. No. 4,864,479 to Steigerwald et al., incorporated by reference herein.

One example of a prior art full bridge DC-DC transistor converter is shown in FIG. 1. The MOSFET transistors Q1, Q2, Q3 and Q4 define the legs of the bridge circuit, and diagonally opposed transistor pairs are alternately gated on and off to establish an AC current in the primary winding T1 of a center-tapped transformer T using input voltage Vbus. The center-tap of transformer T is grounded, and the secondary windings T2 and T3 are coupled to a common node N through diodes D5 and D6. The voltage at node N is filtered by an LC filter comprising the series combination of inductor Lf and capacitor Cf, and the capacitor voltage Vc(t) is applied to a resistive load RL. Each transistor Q1, Q2, Q3, Q4 is depicted as including a diode D1, D2, D3, D4 (which may be the transistor body diode) and a parasitic output capacitance C1, C2, C3 and C4, both connected in parallel with the current-carrying path of the respective transistor.

Once the diagonally opposed transistors Q1 and Q4 are gated on to establish primary winding current in the direction of arrow A, the winding current can be reversed through a resonant transition with zero voltage at transistor turn-on. First, transistor Q4 is gated off, and the primary winding current free-wheels through transistor Q1 and the output capacitances C3 and C4, charging capacitance C4 and discharging capacitance C3. Once capacitance C3 has been discharged, diode D3 becomes forward biased and continues to carry the free-wheeling current. Also, transistor Q3 is gated on at the zero-voltage transition, and the free-wheeling current flows through both diode D3 and the source-to-drain circuit of transistor Q3. When transistor Q1 is gated off, the free-wheeling current charges capacitance C1 and discharges capacitance C2. Once capacitance C2 is discharged, transistor Q2 can be gated on with a zero-voltage transition, the primary winding current in the direction of arrow B flows through transistors Q2 and Q3. The next transition occurs when transistor Q3 is gated off, transistor Q4 is gated on at zero voltage to share the free-wheeling current with diode D4, and transistor Q1 is gated on at zero voltage to complete the transition.

One factor to be considered in the design of a PS-ZVT converter is the transistor power dissipation, particularly since the transistors that conduct the entire free-wheeling current (Q1 and Q2 in the above example) dissipate more power than the transistors (Q3 and Q4) that share the free-wheeling current with a free-wheeling diode. In an actual converter circuit based on FIG. 1, for example, the average power dissipation of transistors Q1 and Q2 is 33 W, while the average power dissipation of transistors Q3 and Q4 is 19 W. The imbalance could be even more pronounced in the case of bipolar transistors such as IGBTs because they cannot conduct in reverse to share the free-wheeling current. Since convenience and economy usually dictate the use of identical devices for each bridge transistor, the selected devices must be designed to tolerate the maximum power dissipation, 33 W in this case. It would clearly be more cost effective if identical lower-wattage devices could be used in place of the higher-wattage devices.

SUMMARY OF THE INVENTION

The present invention is directed to an improved control method for a PS-ZVT bridge converter that achieves balanced average power dissipation in each of the bridge switching devices and lower overall power dissipation. The switching sequence of the switching devices is alternated between two modes by periodically reversing the switching sequence for diagonally opposed switching devices of the bridge. Over a period of operation, each of the switching devices periodically conduct the entire free-wheeling current that occurs during load current reversal transitions so as to balance their average power dissipation.

DESCRIPTION OF THE PREFERRED EMBODIMENT

Figure 1:
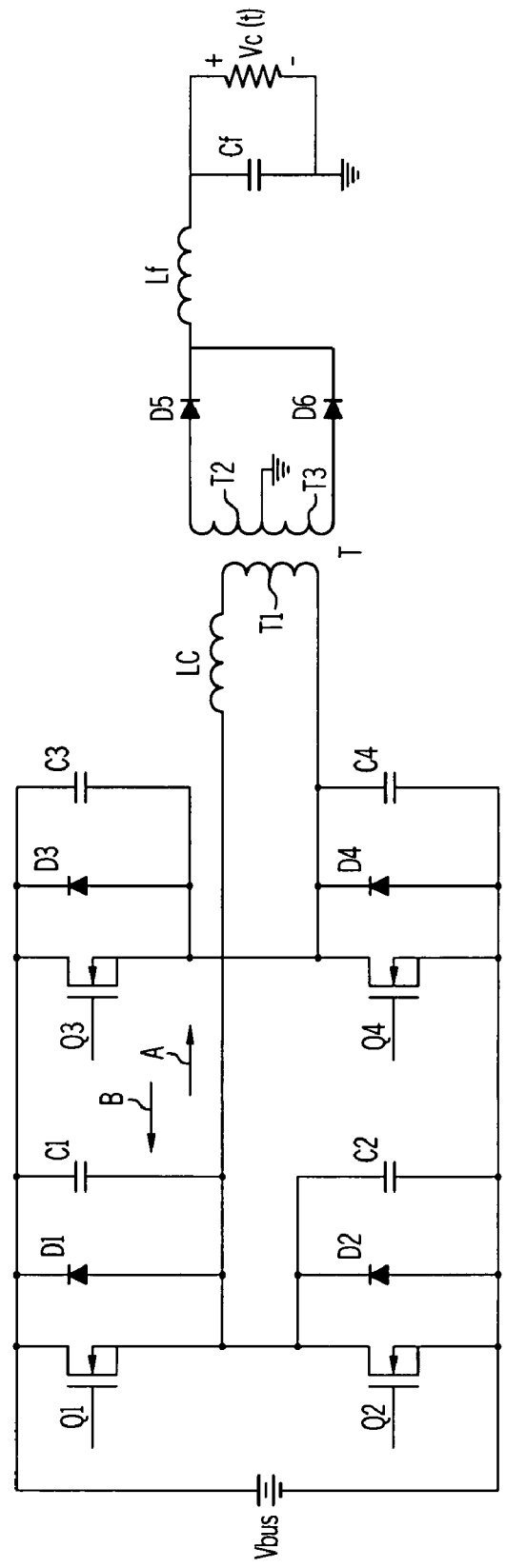
FIG. 1 is a circuit diagram of a prior art PS-ZVT DC-DC transistor bridge converter.
Figure 2A:
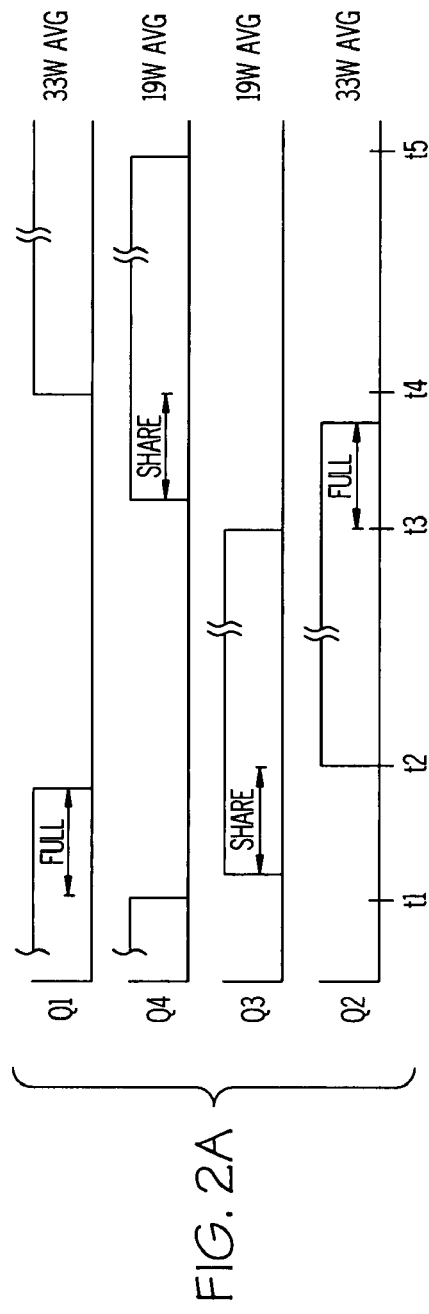
FIGS. 2A and 2B are two alternate timing diagrams for controlling the switching sequence of the bridge transistors of FIG. 1.

The timing diagram of FIG. 2A graphically illustrates a first switching sequence of bridge transistors Q1-Q4 corresponding to the description of FIG. 1 set forth above. A full switching cycle occurs over the interval of t1-t5, with the first current reversal transition occurring in the interval t1-t2, and the second current reversal transition occurring in the interval t3-t4. As indicated, the transistors in the left leg of the bridge (Q1 and Q2) carry the full free-wheeling current during the transition intervals, and transistors in the right leg of the bridge (Q3 and Q4) share the free-wheeling current with a respective free-wheeling diode D3 and D4. For the exemplary converter application mentioned in respect to FIG. 1, the average power dissipation of transistors that carry the full free-wheeling current (Q1 and Q2) is 33 W, while the average power dissipation of transistors that share the free-wheeling current (Q3 and Q4) is 19 W.

Figure 2B:
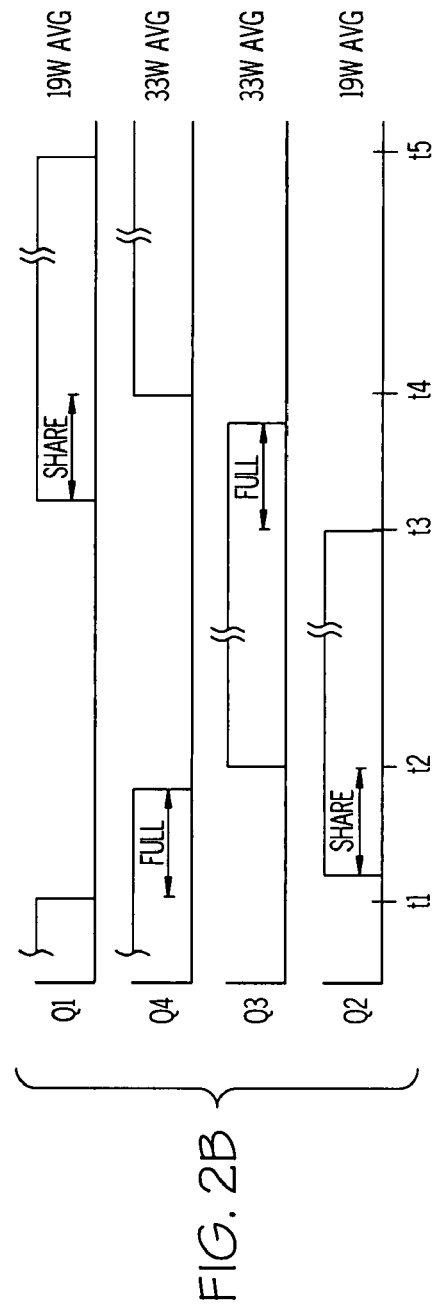

The timing diagram of FIG. 2B illustrates a second switching sequence that is essentially the reverse of the first switching sequence illustrated by FIG. 2A. In the second switching sequence, the transistors in the right leg of the bridge (Q3 and Q4) carry the full free-wheeling current during the transition intervals, and transistors in the left leg of the bridge (Q1 and Q2) share the free-wheeling current with a respective free-wheeling diode D1 and D2. The operation of the converter circuit is unchanged, but now the average power dissipation of transistors Q3 and Q4 is 33 W, while the average power dissipation of transistors Q1 and Q2 is 19 W.

In general, the control method of the present invention reduces the average power dissipation of the converter circuit by alternately driving the bridge transistors Q1-Q4 according to the first and second switching sequences of FIGS. 2A and 2B. For example, the first switching sequence is used for a predetermined number N1 of cycles, whereafter the second switching sequence is used for a predetermined number N2 of cycles, and so on. If N1=N2, the average power dissipated in each of the transistors Q1-Q4 over an extended period of operation will be the same. Specifically, the average power dissipated in each transistor will be the median or average of the two power dissipation levels ordinarily observed. For the above example, the average power dissipation will now be (19 W+33 W)/2, or 26 W. This means that the transistors Q1-Q4 can be designed to withstand an average power dissipation of 26 W instead of 33 W, a reduction of over 21%. Even with devices of the same capacity, the reduced power dissipation will improve transistor durability and reduce the transistor operating temperature (which in turn, reduces the on-resistance, and therefore the power dissipation). The power dissipation reduction may also permit savings in the converter packaging and heat sink.

Figure 3:
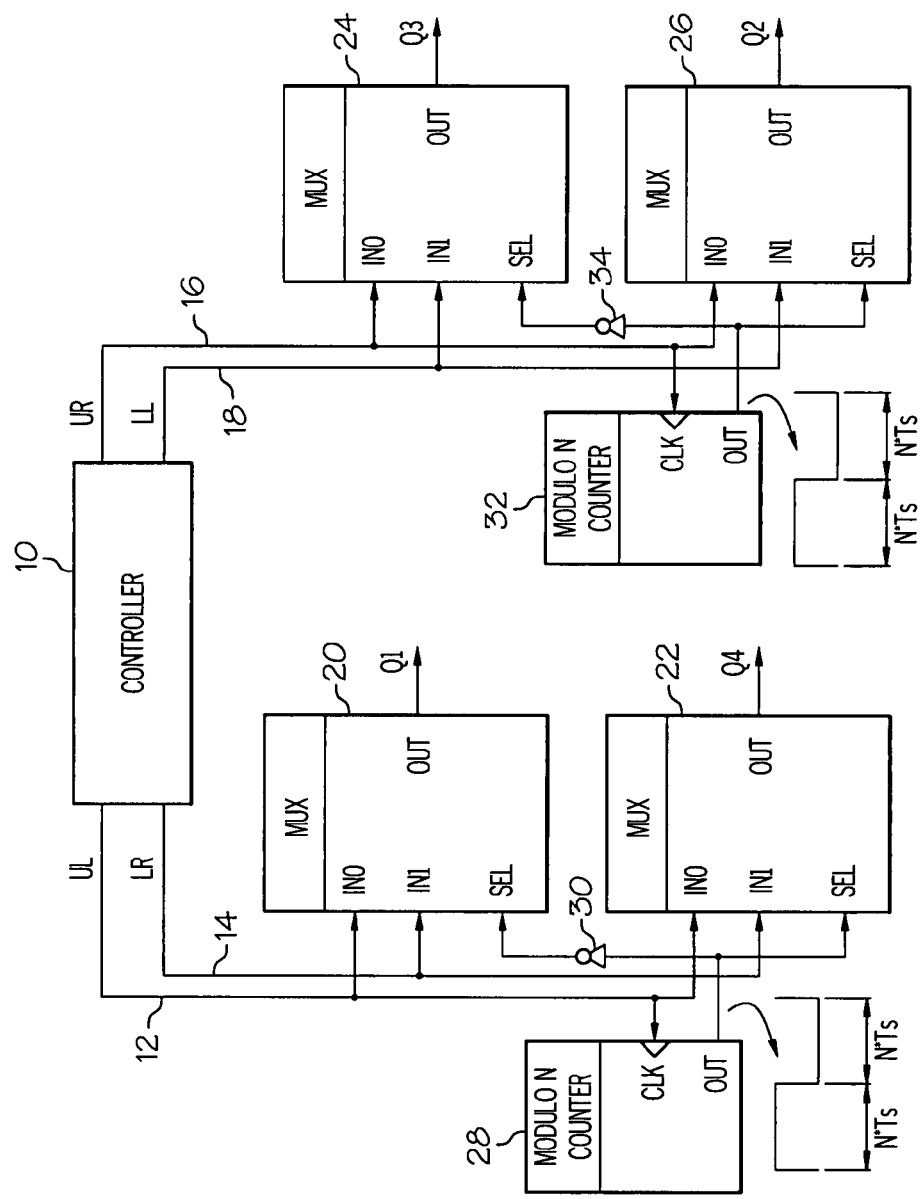
FIG. 3 is a block diagram of a logic circuit for carrying out the control of this invention.

The above-described alternate switching sequence can be implemented with a suitably programmed digital signal processor or microprocessor, or a digital logic circuit, for example. FIG. 3 depicts a suitable digital logic circuit.

Referring to FIG. 3, the reference numeral 10 generally designates a commercially available PS-ZVT bridge drive controller such as the UC3875 Phase Shift Resonant Controller produced by Texas Instruments, or equivalent. The controller 10 produces four phase-sequenced gate drive signals on lines 12, 14, 16, 18 for the four transistors of a full bridge circuit such as shown in FIG. 1. The gate drive signals are identified as UL (for the upper left transistor Q1), LL (for the lower left transistor Q2), UR (for the upper right transistor Q3) and LR (for the lower right transistor Q4). But as demonstrated by the timing diagram of FIG. 2B, the gate drive signals for the diagonally opposed bridge transistors can be reversed to provide an alternate mode of operation in which the power dissipated by the transistors in the right and left legs of the bridge will be reversed.

In the illustrated logic circuit, the gate signals UL and LR are applied to the input ports IN0 and IN1 of 2:1 multiplexers (MUX) 20 and 22; and the gate signals UR and LL are applied to the input ports IN0 and IN1 of 2:1 multiplexers (MUX) 24 and 26. The outputs of MUXs 20 and 22 are coupled to the diagonally opposed bridge transistors Q1 and Q4, respectively; and the outputs of MUXs 24 and 26 are coupled to the diagonally opposed bridge transistors Q3 and Q2, respectively. A first Modulo-N counter 28 clocked by the UL signal on line 12 controls the logic level at the select input (SEL) of MUX 22; inverter 30 applies a signal of the opposite logic level to the select input (SEL) of MUX 20. A second Modulo-N counter 32 clocked by the UR signal on line 16 controls the logic level at the select input (SEL) of MUX 26; inverter 34 applies a signal of the opposite logic level to the select input (SEL) of MUX 24.

The Modulo-N counters 28 and 32 both count the number of switching cycles of the bridge converter, but with a one-half cycle phase shift. Each counter operates at a 50% duty cycle as illustrated, producing a logic-one output for N switching cycles followed by a logic-zero output for N switching cycles, and so on. In the logic-one case, the gate signals UL, LR, UR and LL control the transistors Q1, Q4, Q3 and Q2, respectively, to carry out the switching sequence of FIG. 2A. In the logic-zero case, the gate drive signals LR, UL, LL and UR control the transistors Q1, Q4, Q3 and Q2, respectively, to carry out the switching sequence of FIG. 2B.

In summary, the control of the present invention provides a way of reducing the maximum average power dissipated in the switching devices of a PS-ZVT bridge converter. This allows the use of identical lower-wattage devices in place of higher-wattage devices required for the traditional control, while preserving the high efficiency and low switching loss (and EMI) provided by ZVS circuit topologies. Additional savings may be realized in the thermal interface material of the converter package, and the package size can be reduced as well.

While the present invention has been described with respect to the illustrated embodiment, it is recognized that numerous modifications and variations in addition to those mentioned herein will occur to those skilled in the art. For example, IGBTs or other switching devices may used in place of the illustrated MOSFETs, the specifics of the logic circuit may be different than shown, and so on. Accordingly, it is intended that the invention not be limited to the disclosed embodiment, but that it have the full scope permitted by the language of the following claims.

The invention claimed is:

1. A switching sequence control method for a phase-shifted zero-voltage-transition full bridge converter including switching devices arranged in first and second legs relative to a load circuit, the method comprising the step of:
   alternately turning the switching devices on and off according to: (1) a first switching sequence that results in zero voltage switch transitions but higher power dissipation in the switching devices of the first leg than in the switching devices of the second leg; and (2) a second switching sequence that results in zero voltage switch transitions but higher power dissipation in the switching devices of the second leg than in the switching devices of the first leg; thereby balancing the power dissipation in the first and second legs over a period of converter operation.

2. The switching sequence control method of claim 1, where:
   alternating between the first and second switching sequences reverses an on/off switching pattern for diagonally opposed switching devices of the bridge converter.

3. The switching sequence control method of claim 1, including the steps of:
   counting switching cycles at each switching sequence alternation; and
   alternating between the first and second switching sequences when the switching cycle count reaches a predetermined value.

4. The switch sequence controller of claim 1, including the step of:
   alternating between the first and second switching sequences so as to balance an average power dissipation in the switching devices and lower overall power dissipation of the bridge converter.

5. A switching sequence control method for a phase-shifted zero-voltage-transition full bridge converter including switching devices arranged in first and second legs relative to a load circuit, the method comprising the steps of:
   turning the switching devices on and off according to a first switching sequence in which the switching devices of the first leg fully conduct a free-wheeling current that occurs during load current reversal transitions of the bridge converter; and
   periodically changing from the first switching sequence to a second switching sequence in which the switching devices of the second leg fully conduct the free-wheeling current that occurs during load current reversal transitions of said bridge converter, thereby to balance a power dissipated by said switching devices during said load current reversal transitions and lower an overall power dissipation of the bridge converter.

* * * * *